Patented Nov. 30, 1937

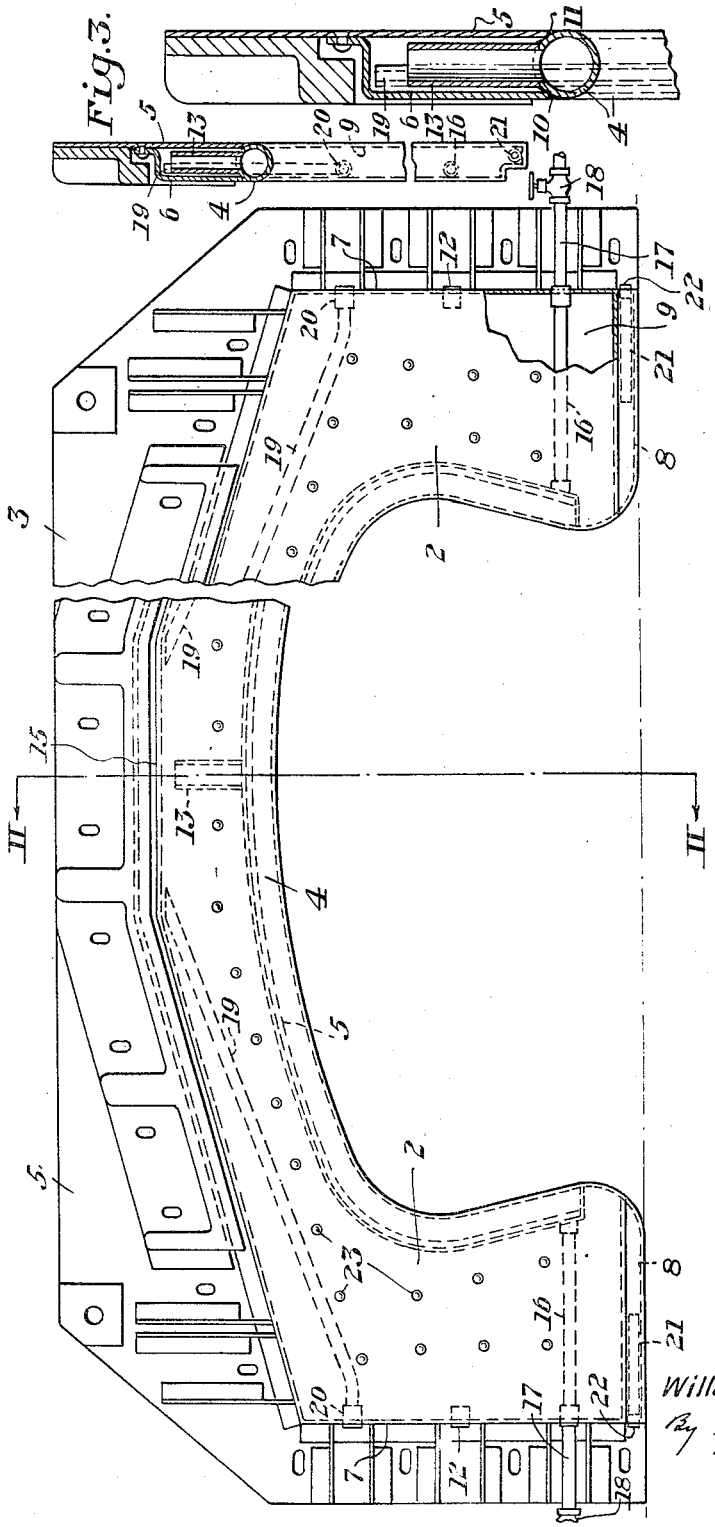

2,100,628

UNITED STATES PATENT OFFICE 2,100,628

FURNACE COOLER

Willard P. Chandler, Jr., Pittsburgh, Pa., assignor to Blaw-Knox Company, Pittsburgh, Pa., a corporation of New Jersey Application April 24, 1937, Serial No. 138,796

6 Claims. (Cl. 122—499)

The present invention relates generally to water coolers for furnaces and, more particularly, to water cooled chill plates for furnaces of the tilting type. It will be understood, however, that my invention is not limited to coolers for furnaces of the tilting type and that it may be equally well applied to various other types of furnaces wherein a water cooler is employed.

In furnaces of the tilting type the ports for supplying combustible materials to the furnace are stationary and the body of the furnace is mounted for tilting movement. At the junction between the ports ordinarily two water cooled chills are employed. One of the chills is attached to the stationary port of the furnace and the other is attached to the tilting end of the furnace. The hot waste gases which are at a very high temperature, approximately 3000° F., pass out of the furnace through the opening which is partially surrounded by the water cooled chill. The edges of this opening about which the water cooled chill extends are subjected to very severe temperatures and none of the water cooled chills which have been used heretofore have been sufficiently effective. None of them have been of such character as to provide a real and satisfactory circulating flow of water or other cooling medium about this opening. In all of those heretofore used the water flow has been induced by the thermal effect on the water and the flow has been quite sluggish. With such slow circulation about this opening bubbles of oxygen collected on the inside face of the cooler as the water was raised in temperature. This action is very similar to that occurring in a glass of cold water which is allowed to stand and warm to room temperature. As it does, it will be noted that bubbles form on the inside of the glass face. The solubility of the oxygen decreases with an increase in temperature. The exceedingly high temperatures which are employed in furnaces of this character have heretofore resulted in the formation of a substantial quantity of moist air bubbles on the steel cooling frame surrounding the opening thereof. The presence of these bubbles in contact with the steel induces pitting and frequently causes failure of the pipe or plate immediately adjacent the furnace opening. The present invention overcomes this difficulty in that it provides a structure which is of such character as to provide a very substantial and continuous flow of water throughout the hottest portion of the cooler.

In accordance with the present invention, I provide a hollow water cooled frame embodying a header which forms the arch of the frame, a plurality of plates forming a hollow top portion of the frame extending above the header, a plurality of plates extending downwardly exteriorly of the header and cooperating with the header to form hollow leg portions of the frame, and conduits and connections arranged so as to provide for forced circulation of a cooling medium, preferably water, throughout the frame and the main header or conduit forming the arch of the frame. The improved frame which I provide is of such character as to cause substantial flow of water through the frame so as to prevent the collection of oxygen on the inner faces of the frame which, as pointed out above, is detrimental causing pitting or failure of the frame. The frame which I provide by my invention embodies connections and conduits which are so arranged as to vent any air which may have collected within the frame.

In the furnace cooler which I provide by my invention the circulation of the water or other cooling medium through the main header which forms the arch of the frame may be in either direction, that is, the water may be introduced into the main header adjacent the top thereof and permitted to circulate downwardly through the legs thereof or it may be introduced into the legs of the U-shaped header and caused to pass upwardly therethrough and out of the main header into the body of the frame by means of a conduit or opening positioned at the top of the frame. In the particular form of my invention shown in the drawing, the water or other cooling fluid is fed to the leg portions of the frame. The water then passes upwardly through the leg portions of the frame toward the center of the frame to a point adjacent the central top portion thereof. At this point an appropriate conduit is provided for permitting the flow of the water downwardly into the U-shaped header surrounding the opening of the furnace. Immediately upon entering the header surrounding said opening, the water divides and a portion flows downwardly through one leg of the header and a portion flows downwardly through the other leg of the header. Adjacent the bottom of each leg a connection is provided which extends between the plates forming the frame so that water passing through the U-shaped header can be discharged directly from the lower ends thereof to the frame discharging opening. The cooler which I provide also has one or more conduits extending from an end wall between the side plates of the frame to a point adjacent the top central portion thereof. Such conduits open into the main body of the frame and any air or excess water may be discharged therethrough.

It is not necessary that the flow of water be in the manner set forth above. The cooling liquid may be fed to the cooler through conduits leading directly to the lower ends of the legs of the U-shaped header surrounding the furnace opening and the water circulated upwardly through the legs of the header and into the main body of the frame. It may then be permitted to pass downwardly through the leg portions of the frame and be discharged through appropriate connections. Or it may be discharged from the frame through the vent pipes which extend to a point near the central top portion of the frame.

This latter method of circulation has certain advantages over that method in which the cooling medium is caused to pass downwardly through the legs of the U-shaped header which surrounds the furnace opening. Due to the fact that the U-shaped header surrounding the furnace opening is relatively large in cross section and due to the fact that the portion of the conduit facing the furnace opening is heated to a greater extent than the opposite side of the conduit, water flowing downwardly therethrough may not come in contact with the inner or furnace opening side of the conduit but may come in contact only with the outer side thereof so that bubbles would have an opportunity to accumulate along the inner side of the conduit. This of course would have a marked tendency to cause the conduit to corrode at this point. By circulating the water upwardly through the legs of the U-shaped conduit, adequate flow of water along the inner face of the conduit to prevent collection of bubbles would take place and, consequently, there would be substantially less tendency for corrosion to take place.

In the accompanying drawing I have shown, for purposes of illustration only, one embodiment of my invention. In the drawing Figure 1 is a front elevational view of the cooler which I provide;

Figure 2 is a sectional view taken along the line II—II of Figure 1; and

Figure 3 is a partial sectional view similar to Figure 2 on an enlarged scale.

In the embodiment shown in the drawing the cooler indicated generally by the reference character 2 is secured to a casting 3 which extends around the outer portion of the cooler and which is appropriately secured to the furnace. The cooler proper is formed of a plurality of plates which are appropriately secured together and which are welded to the substantially U-shaped header 4 which surrounds the furnace opening. The cooler 2 is formed of the header 4, a rear plate 5, a front plate 6, end plates 7 and bottom plates 8. A separate plate forming the top of the frame proper may be employed but, as shown in the drawing, the front plate 6 is bent rearwardly, as shown in Figure 3, and welded, riveted, or otherwise secured to the rear plate 5 so as to form the top closure for the chamber 9 between the front and rear plates.

The header 4 throughout its length forms one of the walls of the chamber 9, the front and rear plates being welded to the header as indicated at 10 and 11 in Figure 3.

An inlet 12 is provided in each of the legs of the frame, the inlets 12 communicating directly with the chamber 9 for supplying water thereto.

A vertically extending conduit 13 is provided adjacent the top wall 15 of the frame. The conduit 13 opens into the chamber 9 at one end thereof and at the other end thereof communicates with the U-shaped header 4.

Conduits 16 are provided at the lower ends of the legs of the U-shaped header 4. Each of these conduits opens into a leg of the header and extends between the front and rear walls of the frame and through the side wall. These openings are outlet openings for permitting the discharge of the cooling fluid directly from the legs of the header 4 from the frame. Appropriate connections 17, including a control valve 18, may be provided so as to permit appropriate discharge of the cooling fluid and so as to also permit regulation of the discharge.

The inlet openings 12 described above are appropriately connected to a water supply by suitable connections. These connections, as well as the connections leading to the outlet conduits 16 may be flexible so as to permit tilting of the cooler with the tilting of the furnace proper.

Conduits 19 are provided to permit any air or gas which may be released within the frame or entrapped therein to be discharged from the chamber 9 and to permit any excess cooling fluid to escape from the frame. Each conduit 19 opens through a side wall of the frame as indicated at 20 and extends angularly through the upper portion of the chamber 9 toward the center thereof. The other end of each conduit 19 is open and communicates with the chamber 9 at a point adjacent the lower face of the flat portion 15 of the top wall. These openings in the conduits 19 are preferably above the upper end of the conduit 13 leading from the main chamber 9 to the header 4.

Wash-out conduits 21 are provided at the bottoms of the legs of the frame so as to permit the cleaning out of the refuse which may collect therein. These conduits, as shown in the drawing, preferably open through the side walls of the frame and are provided with appropriate plugs 22.

The frame is reinforced by a plurality of stay-bolts 23 extending between the plates forming the front and rear faces of the cooler.

As appears from the above description, in the embodiment shown the cooling fluid enters the frame 9 through the inlet openings 12 located in the legs of the cooler, then passes upwardly through the legs of the cooler into the upper portion thereof, then passes downwardly through the conduit 13, then passes downwardly through the legs of the header 4 from where it is discharged from the frame through the conduits 16. The rate of flow of the cooling fluid through the frame may be controlled by the inlet connections or, as shown in the drawing, by valves provided in the outlet connections. Any gas or steam that is liberated from the water within the structure escapes through one or both of the vent conduits 19. These pipes also may carry away any surplus water not taken out through the outlet openings.

As shown in the drawing, and as described above, the top of the cooler for a part of its length is substantially level when the furnace is not tilted. The pipes 19 extend from positions in this level space a short distance above the pipe leading into the header slantwise downwardly toward the sides of the cooler where they discharge. When the furnace is not tipped, any surplus water or any gas or steam may escape with equal readiness toward either side. However, when the furnace is tilted, the top of the cooler will not be level. The end of one of these pipes is then submerged while the end of the other will be adjacent the highest point within the interior of the cooler and at its other end open to the atmosphere so that even though the water supply and the outlet may be of such size or so throttled as to keep the chamber entirely full of water, no accumulation of air, gas or steam can take place within the cooler since it is always vented by one or the other vent pipe, if not by both.

As pointed out above, the water or other cooling fluid may be circulated through the frame in a direction the reverse of that described in detail above. Water may be introduced into the frame through the valves 18 and the conduits 16 and caused to pass upwardly through the legs of the U-shaped header surrounding the furnace opening. It may then pass upwardly through the conduit 13 into the top or body portion of the frame. It may then circulate through the frame and be discharged therefrom through the conduits 19 and the openings 20, or through the openings 12. Where the water is circulated in this manner the openings 12 in the end walls of the frame may be eliminated entirely and the conduits 19 and the openings 20 enlarged so as to take care of all of the water circulated through the frame. One of the advantages in this method of circulating the water through the frame is that it prevents any tendency for bubbles to collect on the inner wall of the U-shaped header adjacent the curved portions thereof. If the circulation is downwardly through this header as described above, there may be some tendency for eddy currents to form at these points and to permit the collection of air at such points. If the circulation is upwardly through the header this accumulation of air will be prevented for adequate water will flow in direct contact with the inner hotter face of the conduit to prevent the collection of air at these points.

It will be apparent from the above description that the cooler which I provide by my invention is of such character as to provide a definite and positive circulation of cooling fluid through the hottest portion of the cooler at all times. It will also be apparent that in a structure of this character it is not necessary to depend upon thermal effects to provide the necessary circulation. It will also be apparent that there will be no opportunity for oxygen to collect on the inner faces of the frames and cause pitting or other types of failure of the parts forming the cooler.

While I have shown and described a preferred embodiment of my invention, it will be understood that my invention is not limited to the exact type of construction which is shown in the drawing. It will also be apparent that the invention is applicable to other types of furnaces than tilting furnaces of the open hearth type. My invention may be otherwise embodied within the scope of the appended claims.

I claim:

1. A furnace cooler comprising a frame formed to provide a circulation chamber therein, a substantially U-shaped header connected with said frame and extending about the furnace opening, said frame having at least one opening communicating with the circulation chamber therein, means adjacent the top of the frame providing communication between the circulation chamber and said header, and conduits communicating with the lower ends of the legs of said U-shaped header and opening through a wall of the frame, whereby cooling fluid entering the cooler is circulated through the circulation chamber and the header.

2. A hollow water cooled frame comprising a header forming the arch of the frame, a plurality of plates forming the hollow top portion of the frame extending above the top of the header, a plurality of said plates extending downwardly exteriorly of the header and cooperating with the header to form the hollow leg portions of the frame, said frame having at least one opening in a wall thereof communicating with the interior thereof, a conduit within the top portion of the frame communicating with the header adjacent the top portion thereof and opening into the hollow top portion of the frame, and a conduit communicating with the header at the lower end thereof and opening through a side wall of the frame, whereby water entering the frame is circulated through the hollow portions thereof and through the header.

3. A hollow water cooled frame comprising a header forming the arch of the frame, a plurality of plates forming the hollow top portion of the frame extending above the top of the header, a plurality of said plates extending downwardly exteriorly of the header and cooperating with the header to form the hollow leg portions of the frame, said frame having an opening in each leg thereof, means within the top portion of the frame communicating with the header adjacent the top portion thereof and opening into the hollow top portion of the frame adjacent the top thereof, a conduit communicating with the header at the lower end thereof and opening through a side wall of the frame, whereby water entering the frame is circulated through the hollow portion thereof, through said conduit, and through the header, and a conduit having one end thereof communicating with the frame adjacent the top portion thereof and having one end thereof opening through a wall of the frame.

4. A hollow water cooled frame comprising a header forming the arch of the frame, a plurality of plates forming the hollow top portion of the frame extending above the top of the header, a plurality of said plates extending downwardly exteriorly of the header and cooperating with the header to form the hollow leg portions of the frame, means within the top portion of the frame providing communication between the header adjacent the top portion thereof and the hollow top portion of the frame, a conduit communicating with the header at the lower end thereof and opening through a wall of the frame, and a conduit having one end thereof communicating with the frame adjacent the top portion thereof and having one end thereof opening through a wall of the frame, whereby water is circulated through the hollow portions of the frame and through the header.

5. A furnace cooler comprising a substantially U-shaped frame having a hollow body portion and hollow leg portions forming a circulation chamber adapted to extend around a furnace opening, a substantially U-shaped header connected with said frame and extending about the furnace opening, said frame having at least one opening communicating with the circulation chamber therein, means adjacent the top of the frame communicating with the circulation chamber and said header for permitting the flow of water between the circulation chamber and said header adjacent the uppermost portion thereof, a conduit connected with the lower end of each leg of the U-shaped header and extending between the walls of said frame and opening through one of the walls thereof, and at least one conduit opening into the frame adjacent the top wall thereof and extending downwardly through the frame and opening through one of the walls thereof.

6. A hollow water cooled frame, comprising a substantially U-shaped header forming the arch of the frame, a plurality of plates forming the hollow top portion of the frame extending above the header, a plurality of said plates extending downwardly exteriorly of the header and cooperating with the header to form the hollow legs of the frame, said header at the upper end thereof having an opening communicating with the top portion of the frame, an outlet conduit connected with each leg of said header for discharging water circulated through the header from the frame, said frame having an inlet opening in each leg thereof for supplying water thereto, and a vent conduit opening into the frame adjacent the top thereof when the frame is in normal position and extending downwardly through the frame and opening through a side wall thereof for permitting the escape of air from the frame.

WILLARD P. CHANDLER, Jr.